(12) United States Patent
Peters et al.

(10) Patent No.: US 9,511,440 B2
(45) Date of Patent: Dec. 6, 2016

(54) METHODS AND SYSTEMS FOR MULTI-WIRE SURFACING

(71) Applicant: Lincoln Global, Inc., City of Industry, CA (US)

(72) Inventors: Steven R. Peters, Huntsburg, OH (US); Michael S. Flagg, Aurora, OH (US); George C. Willard, Willoughby, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 698 days.

(21) Appl. No.: 13/960,870

(22) Filed: Aug. 7, 2013

(65) Prior Publication Data

US 2014/0339203 A1    Nov. 20, 2014

Related U.S. Application Data

(60) Provisional application No. 61/823,632, filed on May 15, 2013.

(51) Int. Cl.
| | |
|---|---|
| *B23K 9/04* | (2006.01) |
| *B23K 9/12* | (2006.01) |
| *B23K 9/173* | (2006.01) |
| *B23K 9/00* | (2006.01) |
| *B23K 9/18* | (2006.01) |

(52) U.S. Cl.
CPC .............. *B23K 9/04* (2013.01); *B23K 9/0017* (2013.01); *B23K 9/121* (2013.01); *B23K 9/1735* (2013.01); *B23K 9/188* (2013.01)

(58) Field of Classification Search
CPC ......... B23K 9/0017; B23K 9/04; B23K 9/121; B23K 9/1735; B23K 9/188
See application file for complete search history.

(56) References Cited

U.S. PATENT DOCUMENTS

| | | | | |
|---|---|---|---|---|
| 4,288,682 | A * | 9/1981 | Toth ................. | B23K 9/125 219/137.71 |
| 2007/0187378 | A1 * | 8/2007 | Karakas ............ | B23K 9/1087 219/130.21 |
| 2009/0294428 | A1 * | 12/2009 | Yoshima ........... | B23K 9/067 219/137 R |
| 2010/0326963 | A1 * | 12/2010 | Peters ............... | B23K 9/122 219/76.14 |

(Continued)

FOREIGN PATENT DOCUMENTS

WO    WO-2011/157285 A1 * 12/2011
WO    WO-2013/136643 A  *  9/2013

*Primary Examiner* — Geoffrey S Evans
(74) *Attorney, Agent, or Firm* — Pearne & Gordon LLP

(57) ABSTRACT

The invention described herein generally pertains to a welding device that deposits a material onto a workpiece, the welding device having with an electrode head and a contact assembly coupled thereto. The contact assembly can house electrodes that allow deposition of material on a workpiece. At least a first set of electrodes and a second set of electrodes can be driven at different speeds. Moreover, welding arcs for one or more electrodes can be established based upon a predetermined order in which the predetermined order can be based on at least one of a location of the electrode head on the workpiece, a start of a welding process, and/or a stopping of a welding process.

15 Claims, 17 Drawing Sheets

(56) References Cited

U.S. PATENT DOCUMENTS

2012/0074114 A1* 3/2012 Kawamoto .......... B23K 9/0731
   219/130.21
2014/0203003 A1* 7/2014 Fujiwara .................. B23K 9/09
   219/125.1

* cited by examiner

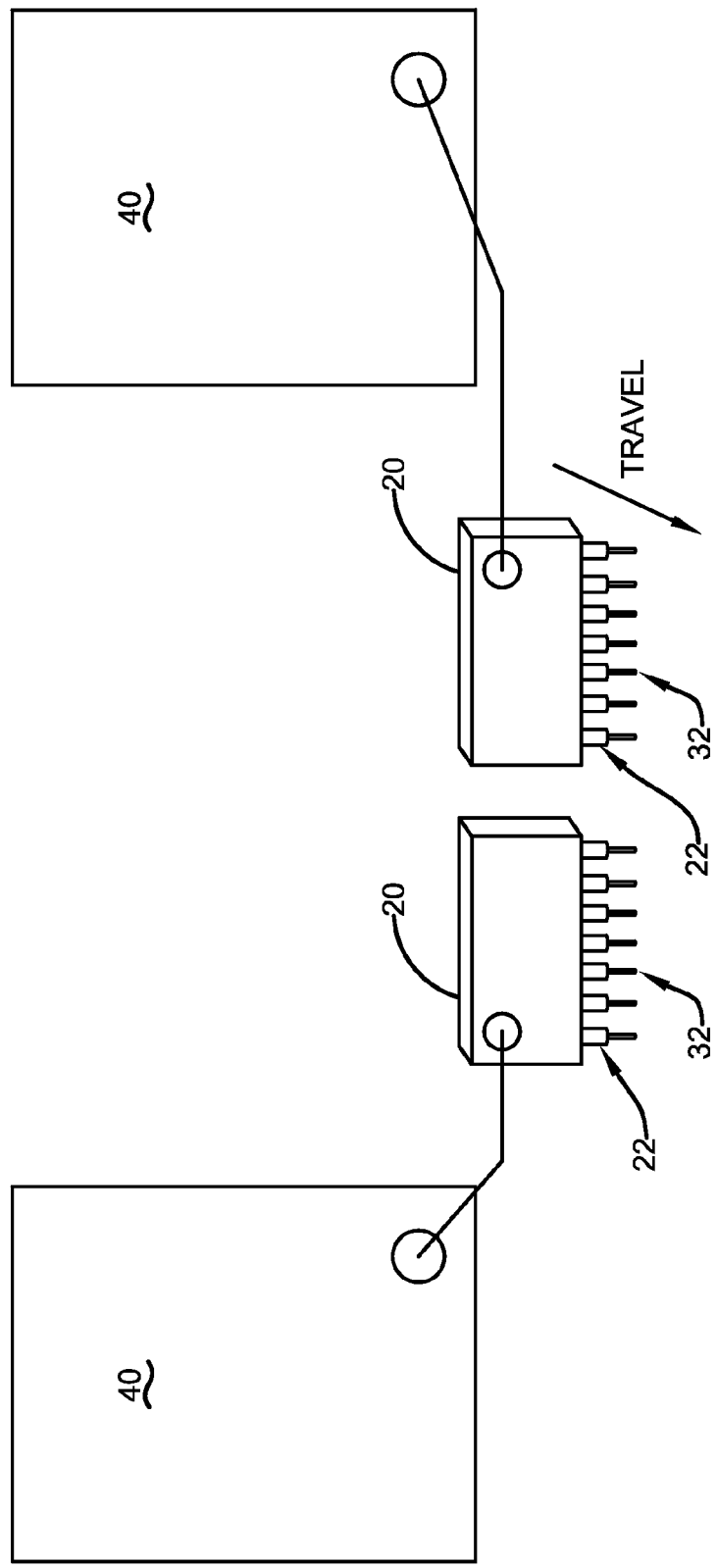

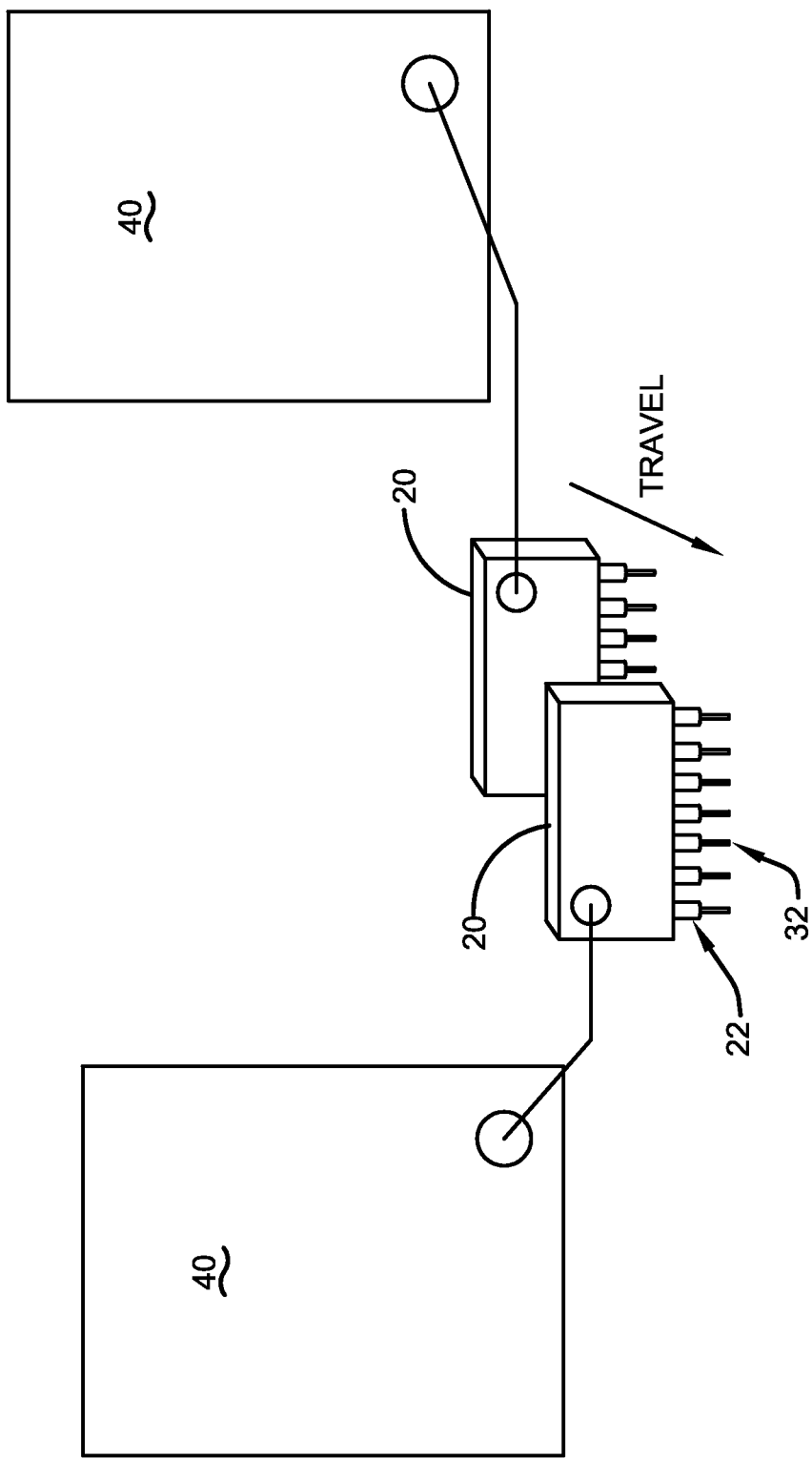

METHODS AND SYSTEMS FOR MULTI-WIRE SURFACING

PRIORITY

This application claims the benefit of priority to U.S. Provisional Application Ser. No. 61/823,632, filed May 15, 2013, and entitled "METHODS AND SYSTEMS FOR MULTI-WIRE SURFACING." The entirety of the aforementioned application is incorporated herein by reference.

TECHNICAL FIELD

The invention described herein pertains generally to welding, and more particularly, to a multi-wire welding device.

BACKGROUND OF THE INVENTION

Metal parts frequently fail their intended use, due not only to fracturing but also to wear and abrasion, including mechanical wear (abrasion and pressure), chemical corrosion, and/or heat. Wear changes a metal part dimensionally and as such functionally. Processes are known for repairing worn metal parts where a durable material is adhered to the degraded surface. Similarly, a durable material may be adhered to a not previously worn surface which may be expected to experience wear. For metal components, this is commonly known as cladding or hard-facing, which can be defined as the application of building up wear-resistant material onto a part's surface by means of welding or joining. The cost of cladding is considerably less expensive than replacement costs and since cladding can be applied to a variety of base metals like: steel, stainless steel, nickel-based alloys, and copper-based alloys, it is widely used throughout the industry today.

A multi-wire SAW is a welding device that can perform cladding. The multi-wire SAW can include an electrode head that is adapted to receive a plurality of electrode contact tips. Each of the contacts tips may be associated with one of the electrodes. The contact tips can be releasably secured to the electrode head. For instance, conventional multi-wire SAW welding devices include an electrode head with apertures adapted to securely receive each of the contact tips respectively. Most conventional techniques include threads within the apertures as well as include corresponding threads on the contact tips for insertion into and removal from the electrode head as needed. Other techniques include set screws that, when tightened, prevent the contact tips from unintentionally dislodging.

Previous methods and systems for cladding use a single electrode having a diameter sufficiently large to deposit cladding material at a cost effective rate. However, this typically results in deeper penetration and higher admixture. Other systems use strip cladding, which is inflexible and not applicable for use with a wide range of alloys. Moreover, the strip electrodes are costly to manufacture and use.

SUMMARY OF THE INVENTION

In accordance with the present invention, there is provided a welding device for depositing material on the surface of a workpiece. The welding device includes an electrode head adapted to concurrently house an array of multiple electrodes in a spaced apart configuration for depositing material on the surface of the workpiece, wherein the array of multiple electrodes includes at least one electrode near a center of the electrode head and plural electrodes located outward of the at least one electrode near the center of the electrode head and the electrode head is actuatable through a welding trajectory. The welding device further includes a welding power source adapted to provide power for establishing a welding arc between each of the multiple electrodes and the workpiece. The welding device further includes at least one drive roll that is configured to drive at least one of the multiple electrodes through the electrode head, wherein the electrodes located outward of the at least one electrode near the center of the electrode head are driven at a first wire feed speed and the at least one electrode near the center of the electrode head is driven at a second wire feed speed. In an aspect of the welding device, the first wire feed speed is greater than the second wire feed speed.

In accordance with the present invention, there is provided a method for depositing material on a workpiece that includes at least the following steps: providing a welding device with an electrode head adapted to concurrently house an array of multiple electrodes in a spaced apart configuration for depositing material on the surface of the workpiece; establishing a welding arc between the multiple electrodes and the workpiece based on a predetermined order; driving a first subset of the array of multiple electrodes through the electrode head at a first wire feed speed; and driving a second subset of the array of multiple electrodes through the electrode head at a second wire feed speed.

In accordance with the present invention, there is provided a welding device that includes an electrode head adapted to concurrently house an array of multiple electrodes in a spaced apart configuration for depositing material on the surface of the workpiece, wherein the array of multiple electrodes includes at least one electrode near a center of the electrode head and plural electrodes located outward of the at least one electrode near the center of the electrode head and the electrode head is actuatable through a welding trajectory. The welding device further includes means for terminating a drive of at least one of the multiple electrodes based on a first predetermined order and means for providing power for terminating the welding arc between each of the multiple electrodes and the workpiece based on a second predetermined order. The welding device further includes means for driving the array of multiple electrodes through the electrode head such that the electrodes located outward of the at least one electrode near the center of the electrode head are driven at a first wire feed speed and the at least one electrode near the center of the electrode head is driven at a second wire feed speed, wherein the first wire speed is greater than the second wire feed speed.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 8 is a perspective view of another embodiment of a welding device;

FIG. 9 is a perspective view of another embodiment of a welding device;

DETAILED DESCRIPTION OF THE INVENTION

Figure 1:
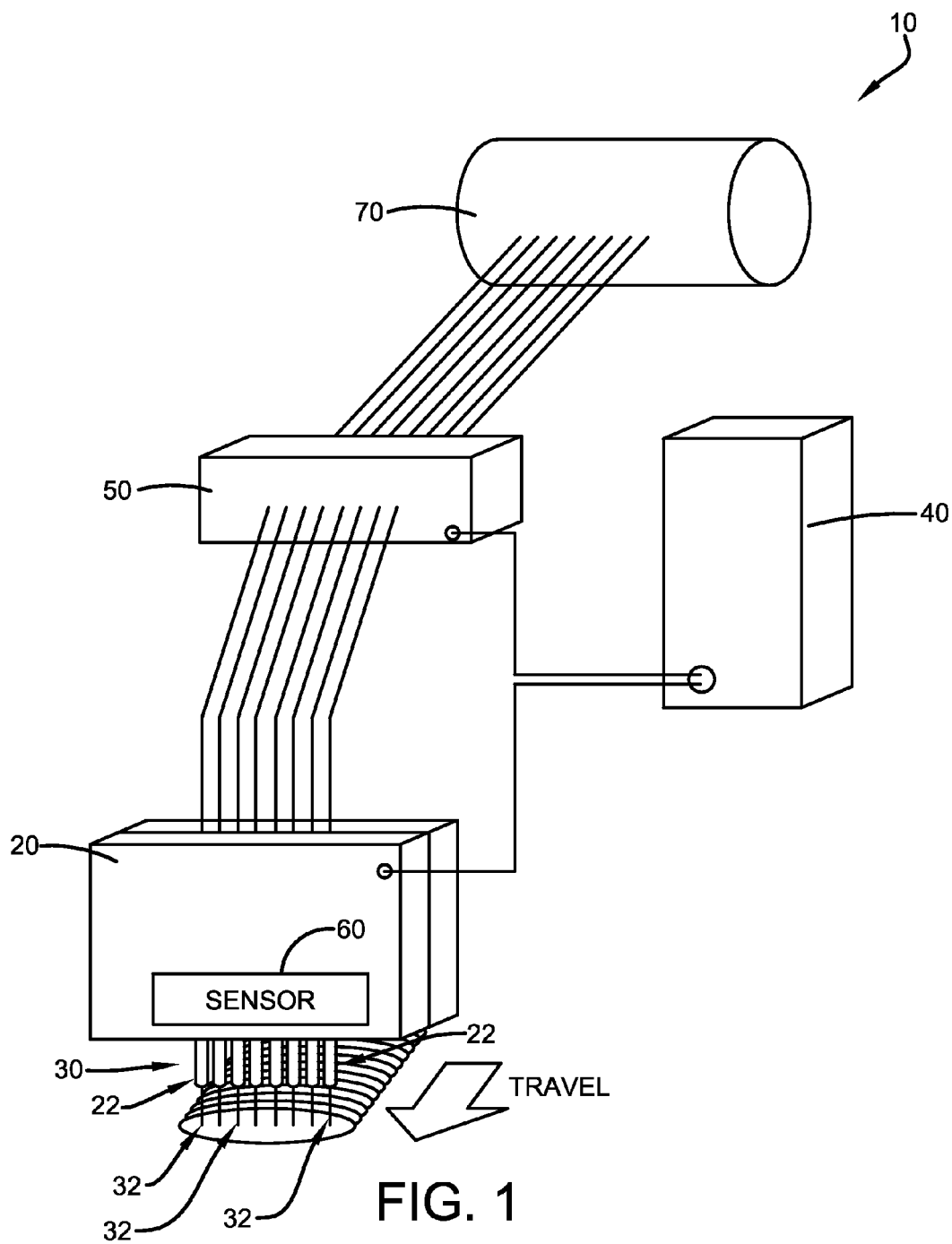
FIG. 1 is a perspective view of a welding device used to deposit a material on a workpiece.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-13 illustrate a welding device depicted generally at 10. It is envisioned that device 10 may typically be used to clad or hard-face a workpiece by a submerged arc or electroslag welding process, although other welding processes such as GMAW, FCAW, TIG, and laser welding may also be employed. Cladding or hard-facing may be defined as a process by which cladding material is adhered to the surface of an existing component, known as a substrate or workpiece. In this manner, the cladding material comprises a wear resistant surface and a barrier to abrasion, erosion and heat during use.

As illustrated in FIG. 1, welding device 10 includes electrode head 20, wherein electrode head 20 concurrently houses array 30 of multiple electrodes 32. It is to be appreciated that the multiple electrode 32 can be continuous feed, periodically feed, or feed based on a predetermined order (discussed in more detail below). Electrodes 32 may be gas-shielded, self-shielded, or metal cored. These electrodes may be solid core, metal core, or flux cored wires, to be used under gas shielding, under a submerged arc flux, or in an electroslag process. In the instance of cored electrodes, it is contemplated that the electrode sheath may be carbon steel, stainless steel, or a nickel alloy. Electrode head 20 houses array 30 such that electrodes 32 are in a spaced apart configuration for concurrently depositing material on a surface of an associated workpiece. It is to be appreciated and understood that electrode head 20 can be any suitable electrode head that houses array 30 to deliver electrodes 32 and the subject innovation is not to be limited by the electrode head illustrated herein. For example, electrode head 20 can be an assembly that utilizes individual contact tips for array 30 or a contact assembly that universally houses and encases the electrode array 30. Electrodes 32 may be provided from coil 70. Coil 70 may include a plurality of individual coils, each coil containing a single electrode, which are arranged along a common axis of rotation. Still any manner of delivering filler wire or cladding material may be chosen without departing from the intended scope of coverage of the embodiments of the subject invention.

As illustrated in FIG. 1, electrode head 20 is adapted to receive array 30 of associated multiple fed electrodes 32. Welding device 10 includes means for driving array 30 of electrodes 32 through electrode head 20. It is envisioned that the means for driving includes plurality of drive rolls 50 or other wire feeder device. Each of the plurality of drive rolls 50 may be associated with one or more of electrodes 32. In one aspect, two electrodes 32 may be associated with a single set of drive rolls 50, although it is envisioned that the relationship between the number of electrodes and the number of wire feeders may be configured such that any number of electrodes may be associated with a single set of drive rolls as appropriate in a cladding process without departing from the intent of the subject disclosure. In another embodiment, each electrode can be driven by a respective drive roll 50. In another embodiment, electrode(s) can be driven by drive roll 50 based on a predetermined order or a second predetermined order to which welding arcs are established with one or more electrodes. In other words, if a predetermined order establishes a welding arc between a first electrode, then a second and third electrode, a first drive roll 50 can drive the first electrode and a second drive roll 50 can drive the second and third electrode. Still, other relationships between drive roll 50 and one or more electrode may be employed with sound engineering judgment.

In one example, drive rolls 50 may be configured to drive electrodes 32 through the electrode head 20 at a rate (e.g., wire feed speed). In an embodiment, the electrodes 32 can be driven at substantially the same rate. In another embodiment, each electrode 32 can be driven at a respective rate that can be predetermined or dynamically identified during a welding procedure. For instance, a rate (e.g., wire feed speed) for one or more electrodes 32 can be predetermined based on material composition, type of weld, welding parameters, workpiece, among others. In another embodiment, a rate for one or more electrodes can be dynamically identified during the welding process based upon criteria such as, but not limited to, user input, feedback, voltage, current, temperature, among others. Alternatively, drive rolls 50 are configured to feed electrodes 32 at slower and/or faster wire speeds/wire feed rates, where it may be desired to change the current needed to melt off the electrode, thereby changing the heat input by electrode 32 into the molten cladding material. For example, one set of drive rolls 50 may be configured to feed electrodes 32 arranged at the outside of array 30 at a one wire feed speed, while a different set of drive rolls 50 may be configured to feed electrodes 32 arranged at the inside of array 30 at a relatively lower wire feed speed as compared to the wire feed speed of the outer electrodes, so as to substantially reduce and/or eliminate the effects of the magnetic force induced by the flow of current through each electrode 32.

In a particular embodiment, electrodes 32 on an arranged on an outside of array 30 can be driven at a first wire feed speed, whereas electrodes 32 arranged at the inside of array 30 can be driven at a second wire feed speed. In such embodiment, the first wire feed speed can be greater than the second wire feed speed. For instance, the first wire feed speed can be 1.5 to 2.0 times faster than the second wire feed speed. In an example, the electrodes arranged near or approximate to the inside of array 30 can be 200 inches per minute (ipm), whereas the electrodes arranged near or approximate to the outside of array 30 can be 400 inches per minute (ipm). It is to be appreciated and understood that the speed variation between inner electrodes 32 compared to outer electrodes 32 mitigates effects of a magnetic field during a welding operation, fills in undercut, and/or provides penetration to a previous weld bead. Moreover, it is to be appreciated that an inner electrode can be any suitable electrode 32 within array 30 that has an electrode on each side thereof. Similarly, it is to be appreciated that an outer electrode can be any suitable electrode 32 within array that has an electrode on only one side thereof. Further, it is to be appreciated that a drive roll 50 can be used to drive one or more electrodes based on a predetermined speed. For instance, each drive roll 50 can be used to drive a respective electrode 32 in array 30, wherein each electrode is driven at a specific and particular wire feed speed. For instance, the wire feed speed for each electrode 32 can vary based upon, but not limited to, wire type, workpiece material composition, environment (e.g., air temperature, humidity, and the like), wire gauge, electrode type, voltage, current, welding device used to perform the welding operation, among others.

In particular, a magnetic force can be resultant from high current in a welding process with an arc established between a workpiece and at least one electrode. The magnetic force places a pinch force on a puddle that is created from the electrode establishing an arc with the workpiece. The pinch force is greatest on an edge (corresponding to an edge or outside of the electrode head) of the puddle, wherein the pinch force pulls the puddle toward the middle (corresponding to a center of the electrode head). The wire feed speed can be increased on the outer electrodes to compensate for the pinch force to increase an amount of material deposited thereby filling any voids that may be resultant from the pinch force.

In one aspect of the embodiments of the subject invention, each of the electrodes 32 are configured to be connected to welding power source 40. That is to say that during the cladding process, for instance, welding power can be delivered through each of electrodes 32 in array 30. Accordingly, cladding material is delivered over a width of electrode head 20. As indicated above, power may be delivered from the welding power source 60 through welding cables (not shown) as attached at one end to studs (not shown). At the distal end, welding cables may be connected to electrode head 20 through an electrode head connector. In the exemplary case of a single welding power source 40, a single electrode head connector may convey power from the welding cables commonly to electrode head 20. Still, other means for conveying power from the welding cables to electrode head 20 may be employed with sound engineering judgment.

Power source 40 supplies power for establishing a welding arc between each of the associated multiple fed electrodes and the associated workpiece 51. In particular, one or more power sources 40 can supply power to one or more electrodes 32 of array 30 based on a predetermined order. For instance, the predetermined order can be based on a location of electrode head 20 on workpiece 51. In another instance, the predetermined order can be based on a starting of a motion of electrode head 20 to begin a welding process. In another embodiment, one or more power sources 40 terminate the welding arc between each of the associated multiple fed electrodes and the associated workpiece 51. In such embodiment, the one or more power sources 40 can terminate the welding arc for one or more electrodes 32 of array 30 with a second predetermined order. For instance, the second predetermined order can be based on a location of electrode head 20 on workpiece 51. In another example, the second predetermined order can be based on a stopping of a motion of electrode head 20 to end a welding process.

Furthermore, an establishment of a welding arc between an electrode 32 and workpiece 51 can be provided by at least one of power source 40 (e.g., supplying power, not supplying power, terminating power supply, and the like) or drive roll(s) 50 (e.g., driving electrode(s), not driving electrode(s), terminating drive of electrode, and the like). Thus, electrodes 32 in array 30 can be activated or deactivated based on a predetermined order, wherein the activation and/or deactivation can be based on power source 40 and/or drive roll(s) 50. In an embodiment, the subject innovation relates to providing controlled establishment of welding arcs to electrodes 32 and/or controlled drive to electrodes 32 for cladding welding processes.

In a particular embodiment, sensor 60 is configured to detect at least one of a location of electrode head 20 on workpiece 51, an alignment of at least one electrode 32 of array 30 compared to workpiece 51, or a nonalignment of at least one electrode 32 of array 30 compared to workpiece 51. Sensor 60 can be coupled or affixed to electrode head 20 on a location in order to detect a location of at least one electrode 32 in reference to the workpiece 51. For instance, sensor 60 is situated on electrode head 20 in a horizontal manner, yet it is to be appreciated that any suitable orientation can be employed. In another embodiment, a plurality of sensors 60 can be used. For example, a sensor can be used for each electrode 32. In such example, the sensor 60 for each electrode 32 can be oriented vertically in line with the respective electrode 32. By way of example and not limitation, sensor 60 can be an infrared (IR) sensor, a proximity sensor, among others. Sensor 60 detects alignment and/or nonalignment of at least one electrode 32 is aligned with at least a portion of workpiece 51. In particular, sensor 60 detects whether an electrode 32 is in contact and/or not in contact with a portion of workpiece 51 to establish a welding arc. In another example, sensor 60 can detect whether a current and/or voltage flow is established through power source 40 and workpiece 51. It is to be appreciated that an alignment between one or more electrode 32 refers to a contact that allows a welding arc to establish between workpiece 51 and electrode 32. Moreover, it is to be appreciated that a nonalignment between one or more electrode 32 refers to a noncontact that does not allow a welding arc to establish between workpiece 51 and electrode 32.

The establishment of a welding arc for one or more electrodes 32 and/or drive of electrodes 32 can be based on a predetermined order. Moreover, the termination of a welding arc and/or drive for one or more electrodes 32 can be based on a predetermined order. In another embodiment, the termination of a drive of at least one drive roll can be based on a predetermined order. The following are examples of various predetermined orders that can be employed with the subject innovation but are solely for example and are not to be seen as limiting on the various embodiments disclosed herein. Moreover, the following examples are based on an electrode head 20 having five (5) electrodes in array 30. Yet, any number of electrodes 32 for array 30 may be chosen with sound engineering judgment without departing from the intended scope of coverage of the embodiments of the subject invention. Moreover, electrodes 32 for array may be configured in any pattern (e.g., linearly, non-linearly, among others) with sound engineering judgment without departing from the intended scope of coverage of the embodiments of the subject invention. For example, electrodes A, B, C, D, and E can be in electrode head 20 (e.g., see FIG. 1). In the example, a sequential establishment of an arc for each electrode can be a basis for a predetermined order such that welding arcs are established in the following order: A; B; C; D; and E. In another example, the predetermined order can be sequential but include electrodes establishing an arc at substantially the same time such as the following order: A and B; C; D and E. In another example, the predetermined order can be as follows: A and B; C; D; and E. In another example, the predetermined order can be the following: E; D; C; B; and A. In still another example, the order can be as follows: E and D; C; B and A. In another instance, the predetermined order can be: E and D; C; B; and A.

In a particular example, a predetermined order can be used to establish a welding arc for one or more electrodes 32 and a second predetermined order can be used to terminate the welding arc for one or more electrodes 32. For instance, the above examples can be used as a predetermined order and/or a second predetermined order. In an embodiment, during a start of a welding operation with a welding device, a predetermined order can be used such that the welding arcs are established as follows: A; B; C; D; and E. During a stop of the welding operation, a second predetermined order can be used such that the welding arcs are terminated as follows: A; B; C; D; and E. It is to be appreciated that any suitable combination, order and/or pattern can be utilized to establish a welding arc and/or terminate a welding arc for one or more electrodes 32.

In a particular example, a predetermined order can be used to drive wire for one or more electrodes 32 and a second predetermined order can be used to terminate the drive of wire to one or more electrodes 32. For instance, the above examples can be used as a predetermined order and/or a second predetermined order. In an embodiment, during a start of a welding operation with a welding device, a predetermined order can be used such that wire is driven as follows: A; B; C; D; and E. During a stop of the welding operation, a second predetermined order can be used such that drive of wire is terminated as follows: A; B; C; D; and E. It is to be appreciated that any suitable combination, order and/or pattern can be utilized to drive wire and/or terminate wire drive for one or more electrodes 32. It is to be appreciated that a termination of a drive of wire to an electrode can terminate a welding process.

Figure 2:
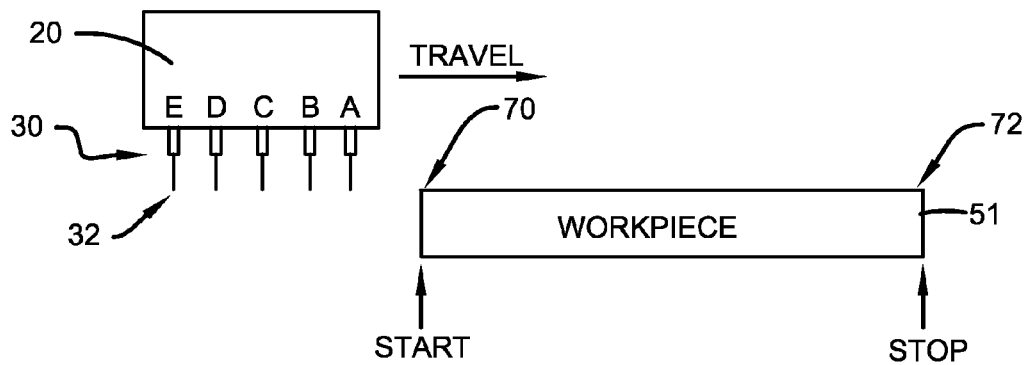
FIG. 2 is a perspective view of a welding device that establishes and/or terminates an arc for one or more electrodes of an electrode head based on a predetermined order.

Turning to FIG. 2, electrode head 20 having five (5) electrodes 32 in array 30 can deposit material onto workpiece 51 in a direction of travel. Conventionally, electrodes 32 in array 30 are driven continuously and simultaneously. Additionally, conventional techniques establish welding arcs for electrodes 32 simultaneously. The subject innovation allows a predetermined order for welding arc establishment and/or drive of electrodes 32 in order to deposit material onto workpiece 51. For instance, workpiece 51 includes start point 70 (e.g., start location) and stop point 72 (e.g., stop location), wherein start point 70 corresponds to a start of motion for welding by electrode head 20 and stop point corresponds to a stop of motion for welding by electrode 20. For instance, sensor 60 can detect start point 70 and/or stop point 72. It is to be appreciated that start point 70 and stop point 72 can be any location on workpiece 51 although depicted on ends opposite of one another in FIG. 2. In general, a predetermined order can be employed for establishment of welding arc for electrodes 32 and/or drive of electrodes 32. In FIG. 2, a sequential order can be the predetermined order in which an electrode is activated and/or driven one-at-a-time based on placement in electrode head 20. For example, electrodes 32 can have welding arcs established in a sequence starting from right to left (e.g., A; B; C; D; then E) to correspond deposit of material on workpiece 51 in accordance with start point 70. For example, electrodes 32 can be driven in a sequence starting from right to left (e.g., A; B; C; D; then E) to correspond deposit of material on workpiece 51 in accordance with start point 70. Additionally, a sequential order can be the predetermined order in which an electrode is deactivated and/or not driven one-at-a-time based on placement in electrode head 20. For example, electrodes 32 can have welding arcs terminated in a sequence starting from right to left (e.g., A; B; C; D; then E) to correspond deposit of material on workpiece 51 in accordance with stop point 72. For example, drive of electrodes 32 can be terminated in a sequence starting from right to left (e.g., A; B; C; D; then E) to correspond deposit of material on workpiece 51 in accordance with stop point 72.

In another embodiment, a start of motion can include a predetermined order for drive of electrodes 32 and/or establishing welding arc for electrodes 32. Still further, a stop of motion can include a second predetermined order for a drive of electrodes 32 to terminate and/or a welding arc for electrodes 32 to terminate. It is to be appreciated that a predetermined order (e.g., for electrode 32 drive and/or establishment of welding arc) can correspond to a location of electrode head 20 compared to workpiece 51, a start of motion of electrode head 20, a start of a welding process, and the like. Moreover, it is to be appreciated that a second predetermined order (e.g., for termination of electrode 32 drive and/or termination of welding arc) can correspond to a location of electrode head 20 compared to workpiece 51, a stop of motion of electrode head 20, a stop of a welding process, and the like.

Figure 3:
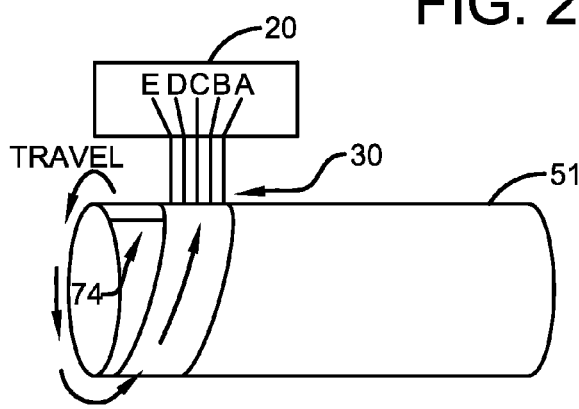
FIG. 3 is a perspective view of a welding device used to deposit a material on a workpiece with a curved surface.
Figure 4:
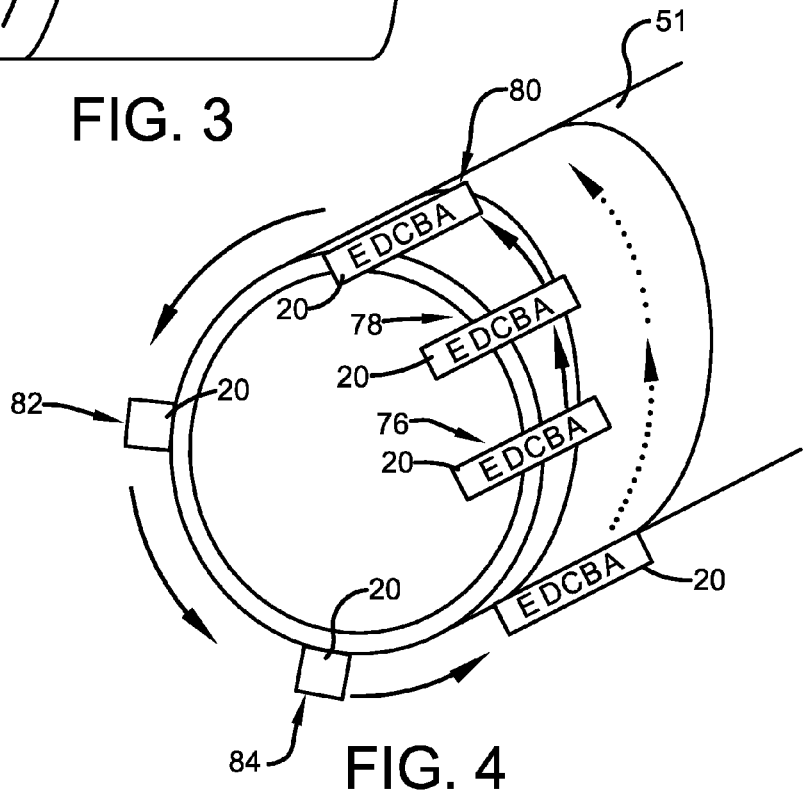
FIG. 4 is a perspective view of a welding device that employs a predetermined order to establish and/or terminate an arc for one or more electrodes within an electrode head of the welding device.

FIG. 3 and FIG. 4 illustrate workpiece 51 that includes a curved surface. In particular, workpiece 51 can be, but is not limited to being, cylinder shaped, concave, convex, curved, rounded, circular, spherical, and the like. Conventionally, electrode head 20 travels around workpiece 51 in a spiral direction of travel to deposit material onto workpiece 51. Yet, conventional techniques require reworking as space 74 does not receive deposited material from the welding process. In order to eliminate reworking and/or deposit material on workpiece 51, a predetermined order for drive and/or establishing of welding arc(s) for electrodes 32 in array 30 is provided. Moreover, a second predetermined order for termination of electrode 32 drive and/or termination of welding arc(s) is provided.

The following example describes establishment or termination of welding arcs for electrodes 32 based on a predetermined order at a start of a welding process and/or a second predetermined order at a stopping or end of a welding process. However, it is to be appreciated and understood that electrodes 32 can be driven or not driven based on the predetermined order and/or the second predetermined order and the following example is not to be limiting. During a start of a welding process (following arrows on FIG. 3), a direction of travel can be from first position 76 to second position 78 to third position 80 to fourth position 82 to fifth position 84 to sixth position 86 (and continue the path of dotted arrows illustrated). As electrode head moves on workpiece 51 in a direction of travel that spirals around workpiece 51, welding arcs can be established with electrodes 32 using a predetermined order. At first position 76, a welding arc is established with electrode A of electrodes 32 in array 30. At second position 78, a welding arc is established with electrode B of electrodes 32 while welding arc is maintained with electrode A. At third position 80, a welding arc is established with electrode C of electrodes 32 while welding arc is maintained with electrodes A and B. At fourth position 82, a welding arc is established with electrode D of electrodes 32 while welding arc is maintained with electrodes A, B, and C. At fifth position 84, a welding arc is established with electrode E of electrodes 32 while welding arc is maintained with electrodes A, B, C, and D. At sixth position 86, the electrodes 32 have welding arcs established to continue the depositing of material onto workpiece 51 and continue along the travel path indicated with the dotted arrows. As discussed above, any suitable order can be utilized with the above at various location or points and the subject innovation is not limited to the above example. For instance, rather than an order of A; B; C; D; and E, the order can be A and B; C; D; and E.

During a termination of a welding process (opposite of arrows on FIG. 3), a direction of travel can be from sixth position 86 to fifth position 84 to fourth position 82 to third position 80 to second position 78 to first position 76. As electrode head moves on workpiece 51 in a direction of travel that spirals around workpiece 51 (indicated by the opposite direction of the arrows), welding arcs can be terminated with electrodes 32 using a second predetermined order. Moving from sixth position 86 to fifth position 84, a welding arc is terminated with electrode E of electrodes 32 in array 30. At fourth position 82, a welding arc is terminated with electrode D of electrodes 32 while welding arc is maintained with electrodes A, B, and C. At third position 80, a welding arc is terminated with electrode C of electrodes 32 while welding arc is maintained with electrodes A and B. At second position 78, a welding arc is terminated with electrode B of electrodes 32 while welding arc is maintained with electrode A. At first position 76, a welding arc is terminated with electrode A of electrodes 32. As discussed above, any suitable order can be utilized with the above at various location or points and the subject innovation is not limited to the above example. For instance, rather than an order of E; D; C; B; and A, the order can be E; D; C; then B and A. It is to be appreciated that termination of the welding arc between an electrode and the workpiece can be achieved by at least one of terminating the welding arc, terminating a power source to the electrode, terminating a drive of wire to the electrode, a combination thereof, among others.

In an embodiment, the welding power source is further adapted to provide power for establishing the welding arc in a predetermined order for one or more of the multiple electrodes. In an embodiment, the predetermined order is based on a location of the electrode head on the workpiece. In an embodiment, the welding power source is further adapted to provide power for establishing the welding arc in the predetermined order for one or more of the multiple electrodes during a start of motion of the electrode head through the welding trajectory. In an embodiment, the welding power source is further adapted to withhold power for establishing the welding arc in the predetermined order for one or more of the multiple electrodes during a stop of motion of the electrode head through the welding trajectory.

In an embodiment, magnetic forces resulting from electrical current flowing through the multiple electrodes affects the deposition of material on the surface of the workpiece. In an embodiment, the electrode head is configured to house the array of multiple electrodes in a positional arrangement that reduces the effects the magnetic forces upon material deposition. In another embodiment, the electrodes located outward of the at least one electrode near the center of the electrode head are driven at the first wire feed speed to compensate for a pinch force resultant of the magnetic force. In addition, the electrodes located outward of the at least one electrode near the center of the electrode head are driven at a first wire feed speed to increase penetration for the electrodes located outward of the at least one electrode near the center of the electrode head. It is to be appreciated that the first wire feed speed being at least 1.5 times greater than the second wire feed speed. In an embodiment, the electrode head includes a plurality of apertures adapted to receive the multiple electrodes and the apertures are positionally arranged in a non-linear configuration. In an embodiment, the electrode head is configured to house the array of multiple electrodes in a positional arrangement that is least partially V-shaped. In an embodiment, each of the multiple electrodes in the array are connected to the same voltage potential. In an embodiment, the array of multiple electrodes are substantially, linearly arranged within the electrode head. In an embodiment, the at least one drive roll is associated with at least one of the multiple electrodes.

In an embodiment, the welding device can include a sensor that is configured to detect an alignment between at least one electrode located outward of the at least one electrode near the center of the electrode head and the workpiece. In the embodiment, the at least one drive roll drives at least one electrode located outward of the at least one electrode near the center of the electrode head based on the sensor. In the embodiment, the welding power source provides power for establishing a welding arc for the at least one electrode based on the sensor. In an embodiment, the welding device includes a sensor that is configured to detect a nonalignment between at least one electrode located outward of the at least one electrode near the center of the electrode head and the workpiece. In the embodiment, the at least one drive roll terminates drive of at least one electrode located outward of the at least one electrode near the center of the electrode head based on the sensor. In the embodiment, the welding power source terminates a welding arc for the at least one electrode based on the sensor.

Figure 5:
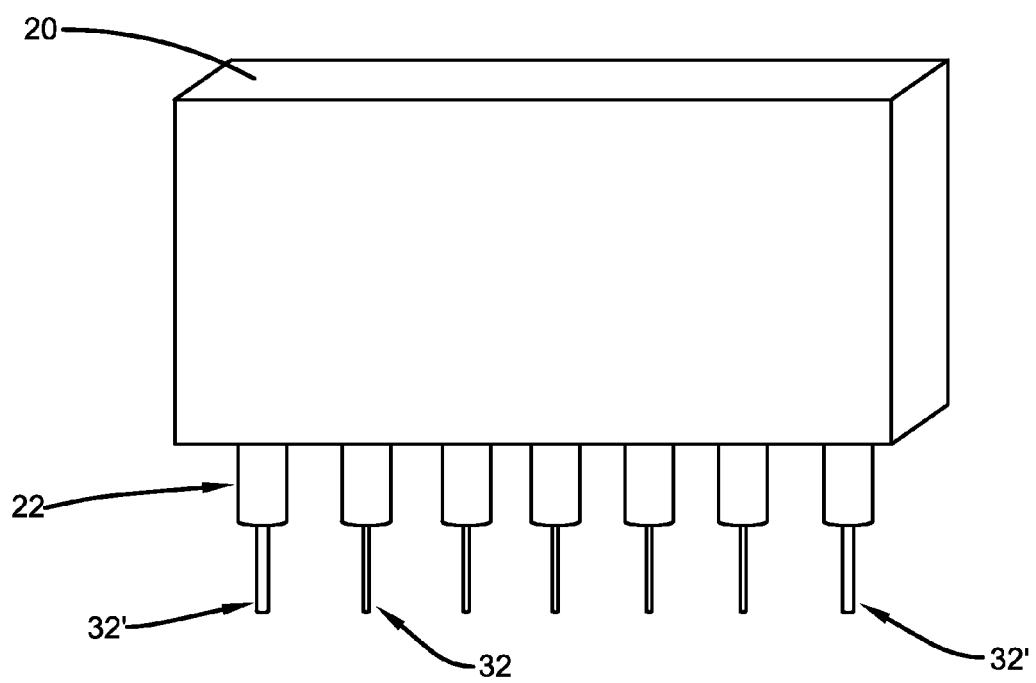
FIG. 5 is a perspective view of an embodiment of an electrode head.

In an embodiment, workpieces are clad using one or two electrodes in combination with a head oscillator, which moves the weld head back and forth across the workpiece to increase the width of the cladding material. In another embodiment, a strip electrode may be used to clad a workpiece and can typically be 45-120 mm wide and 0.5 mm thick. Strip electrodes allow straight progression with a wide bead and minimal penetration. For instance, the use of a single wire can be weaved back and forth to increase the width of the bead and reduce penetration and/or admixture. In another embodiment, the one or two electrodes in combination with a head oscillator can include individual electrodes with diameters greater than $3/32$ of an inch. Turning back to the subject disclosure, the diameter of electrodes 32, in contrast to the prior art, may be less than 1/16 of an inch. More specifically, electrodes 32 may range between about 0.020 and 0.060 inches. Yet more specifically, the diameter of electrodes 32 may be about 0.045 inches. As shown in FIG. 5, the plurality of electrodes 32 may include electrodes having substantially differing diameters. For example, electrodes 32 nearer the center of electrode head 20 may be 0.020 inch or 0.035 inch in diameter, while electrodes 3T nearer the outside of electrode head 20 may be 0.045 inches in diameter. Larger diameter wires may melt off at higher current levels than smaller diameter wires, and such an arrangement may force more heat produced by the current to the edge of the molten cladding material deposit.

Further, the diameter of electrodes 32 may impact the amount of current applied to the electrodes. For example, an array having six 0.045 inch diameter electrodes may be powered by a first current, while a similar array of six 0.035 inch diameter electrodes may be powered by second current. In such an example using 0.035 inch diameter electrodes, it may be necessary to increase the wire feed, that is the rate at which the electrode is fed to the electrode head 20, to maintain a deposition rate approximately the same as when using a 0.045 inch diameter. In general, as wire size is decreased, the deposit rate increases at a given current or as wire size is decreased, the current (and penetration) drops for a given deposit rate.

Figure 6A:
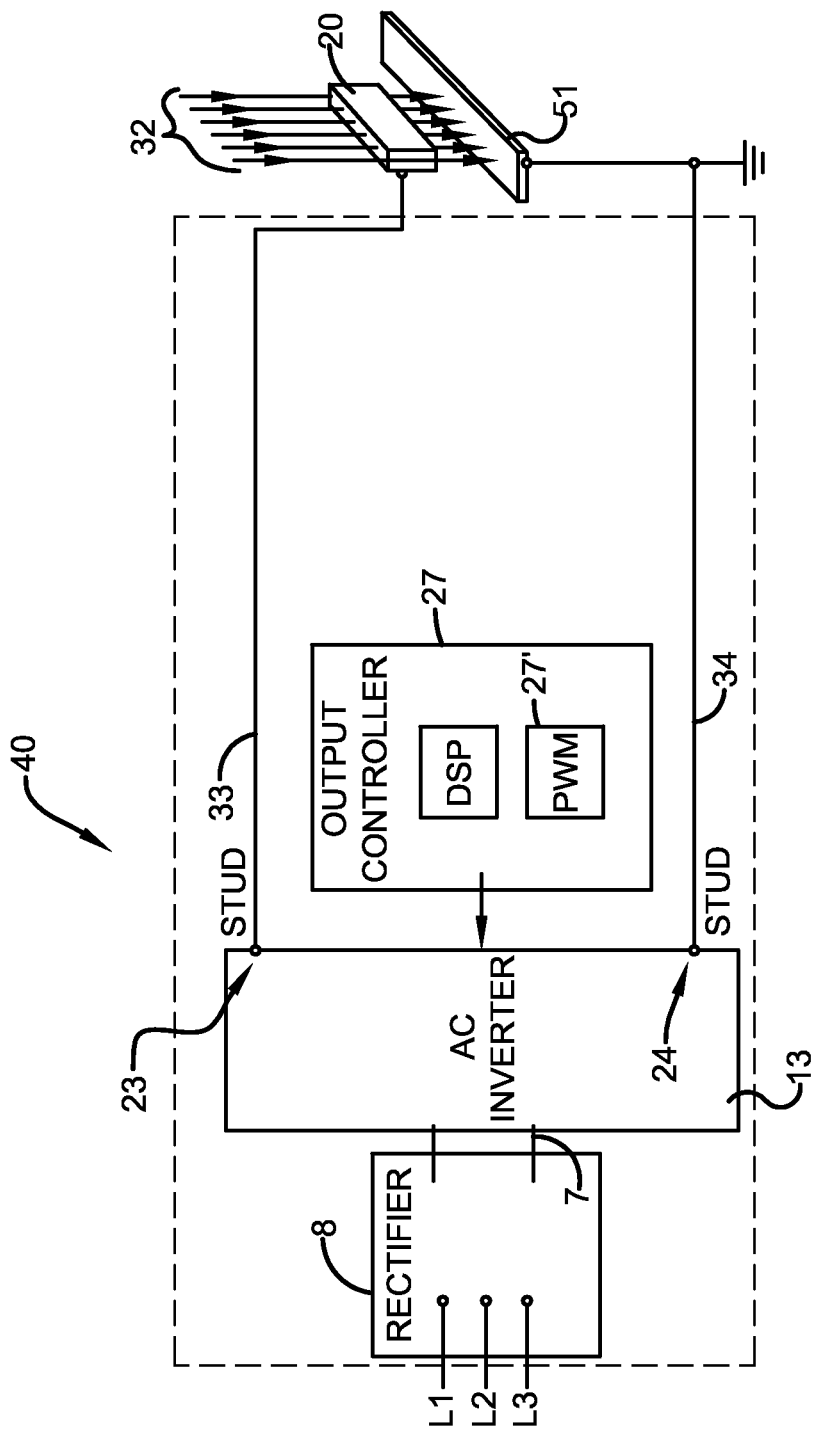
FIG. 6A is a schematic representation of an exemplary welding power supply.
Figure 6B:
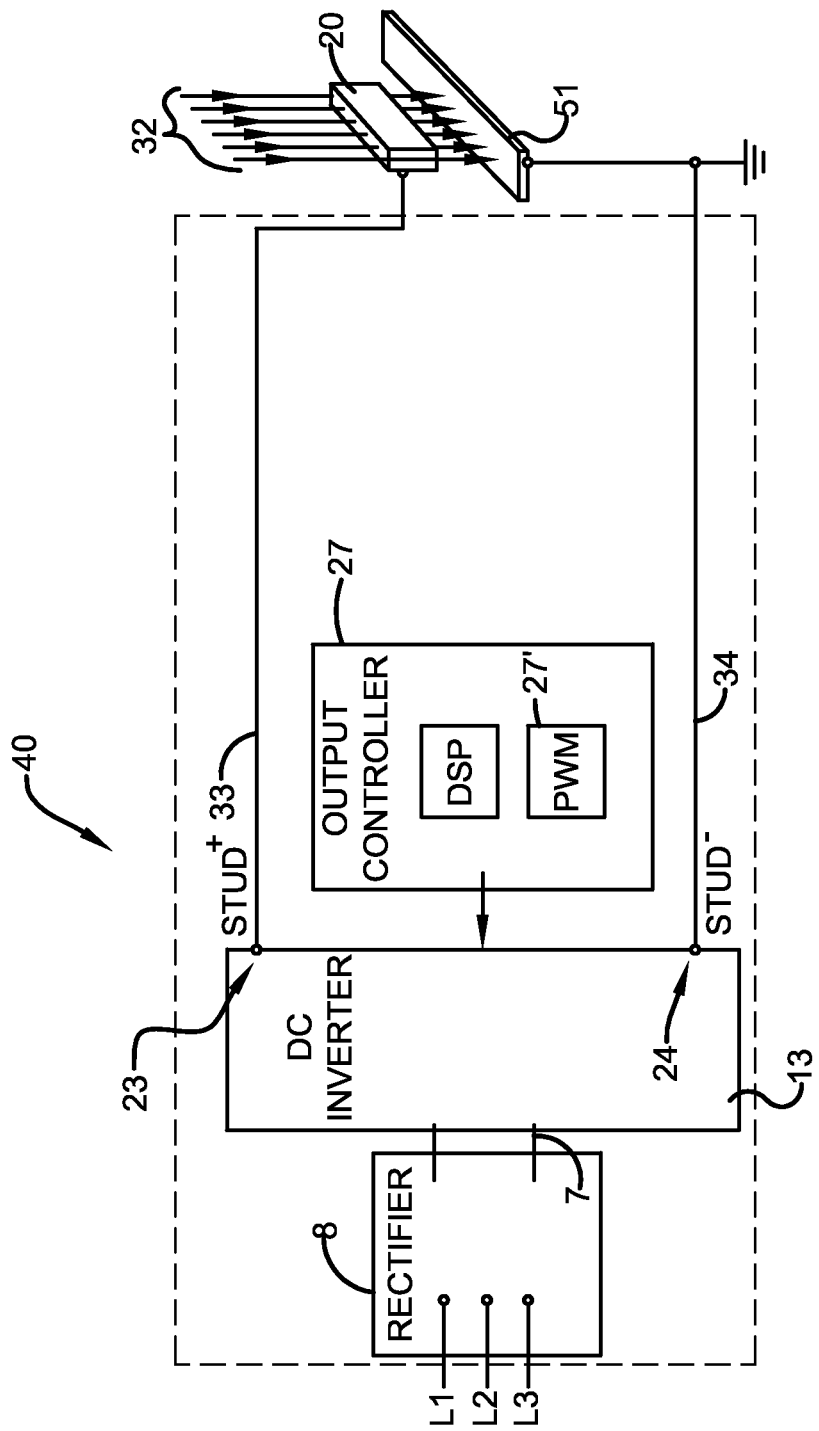
FIG. 6B is a schematic representation of an exemplary welding power supply.

Referencing FIGS. 6A and 6B, welding device 10 may further include a welding power source 40 as is known in the art, and which described hereafter, is exemplary in nature. One power source that may be used is the Power Wave® power supply manufactured by The Lincoln Electric Company in Cleveland, Ohio. In the current embodiment, three phase power, shown by input power lines L1, L2 and L3, is directed to a power source rectifier 8 that produces a DC signal through conductors 7, of which the DC signal may be further directed to the input of an inverter 13. In one embodiment, the inverter 13 includes a transformer having primary and secondary windings in a manner well known in the art. Output from the secondary windings may be directed to a rectifier providing positive and negative supply power to power output terminals 23, 24, respectively, also referred to as studs 23, 24 for delivering DC power to the electrodes 32 received within the electrode head(s) 20. The power source 40 may further include a power output controller 27 electrically communicated to the rectifier for gauging or controlling output power at the studs 23, 24 during the welding or cladding process. In one embodiment, the controller 27 may include a pulse wave modulator 27' or PWM 27'. Welding cables 33, 34 may be connected to the power supply 40, and more specifically to the studs 23, 24, for delivering welding current to a work piece 51 through the electrodes of the electrode head 20.

Alternative embodiments envision the use of welding device 10 having a power source 40 that delivers AC power. In a similar manner, input power lines L1, L2 and L3 deliver power to a rectifier, which steps the voltage up/down to the appropriate levels. However, in this embodiment, the output controller 27 controls the output to generate an AC signal or any AC waveform suitable for use with the embodiments of the subject invention.

Figure 7:
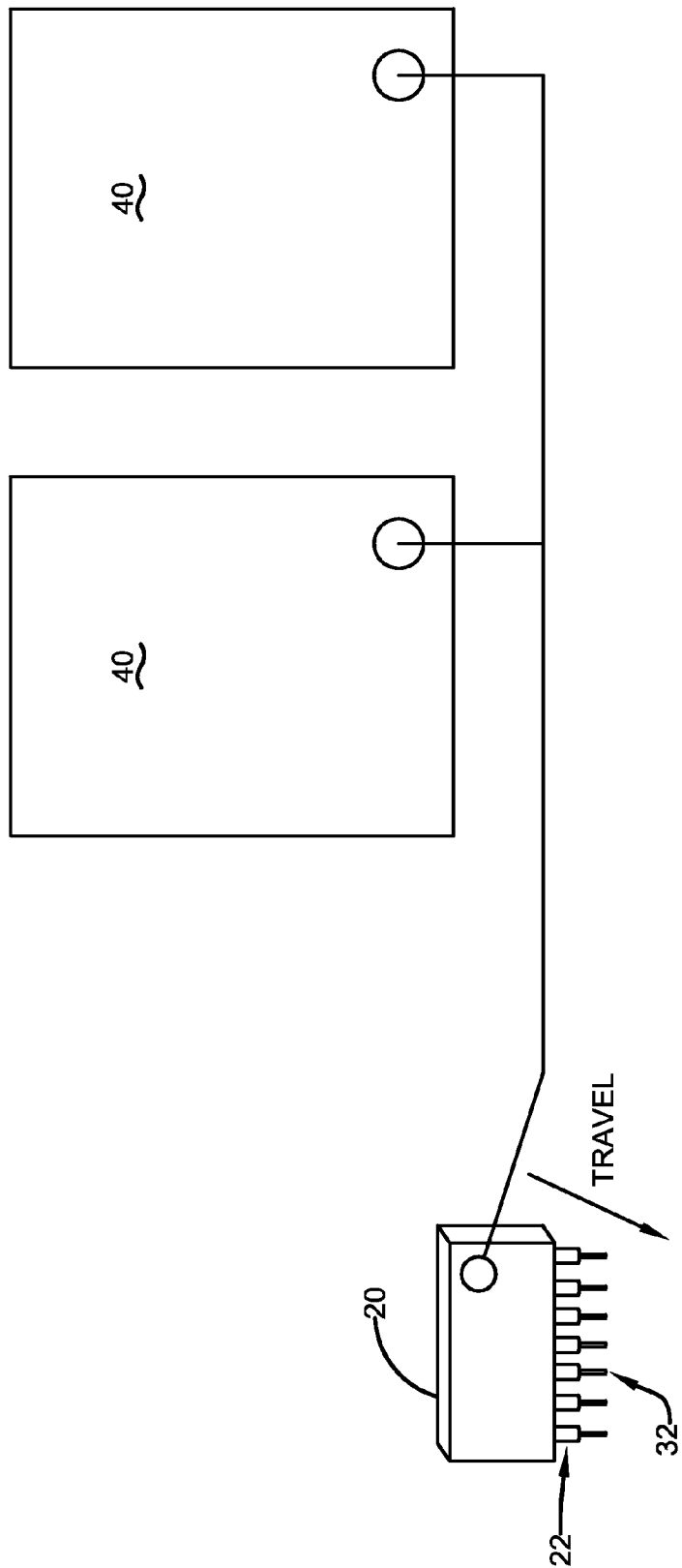
FIG. 7 is a perspective view of another embodiment of a welding device.

In one embodiment, welding device 10 may include a single power source for applications in which current less than, for example, about 1000 amps may be utilized. However, in applications in which current in excess of, for example, about 1000 amps may be utilized, multiple power sources 40 may be connected in parallel as shown in FIG. 7 to provide the requisite current to welding device 10. Of course, persons of skill in the art will readily see both DC and/or AC type power sources 40 may be connected in the aforementioned manner.

In another embodiment shown in FIG. 8, at least two electrode heads 20 may be arranged substantially next to each other, perpendicular to the path of the welding trajectory, to provide for a wider deposition of cladding material. In such an embodiment, it is envisioned that each electrode head 20 may be connected to a separate power source 40. However, it is also contemplated that a single power source 40 may power more than one electrode head 20, depending on the power requirements of the cladding operation.

In still a further embodiment shown in FIG. 9, at least two electrode heads 20 may be provided where a first electrode head is positioned substantially in front of a second electrode head to increase the deposition of cladding material over the same workpiece area. Such an arrangement may increase productivity by reducing the number of cladding passes made by a single electrode head.

In one aspect of the embodiments of the subject invention, each of the electrodes 32 may be configured to be connected to the welding power source 40 having the same voltage potential. That is to say that during the cladding process welding power is delivered through each of the electrodes 32 in the array at substantially the same rate. Accordingly, cladding material is delivered substantially uniformly over the width of the electrode head 20. Uniform penetration of the substrate is also achieved. As indicated above, power may be delivered from the welding power source 40 through welding cables 33, 34 as attached at one end to studs 23, 24. At the distal end, welding cables 33, 34 may be connected to the electrode head 20 through an electrode head connector. In the exemplary case of a single welding power source 40, a single electrode head connector may convey power from the welding cables 23, 24 to the contact tips or contact assembly used with electrode head 20. In an embodiment, it follows that for multiple sources 40, multiple electrode head connectors may be employed that are commonly connected to the each of the contact tips 22. In another embodiment, a contact assembly that universally encases each electrode of array 30 can be used with the electrode head 20.

Figure 10A:
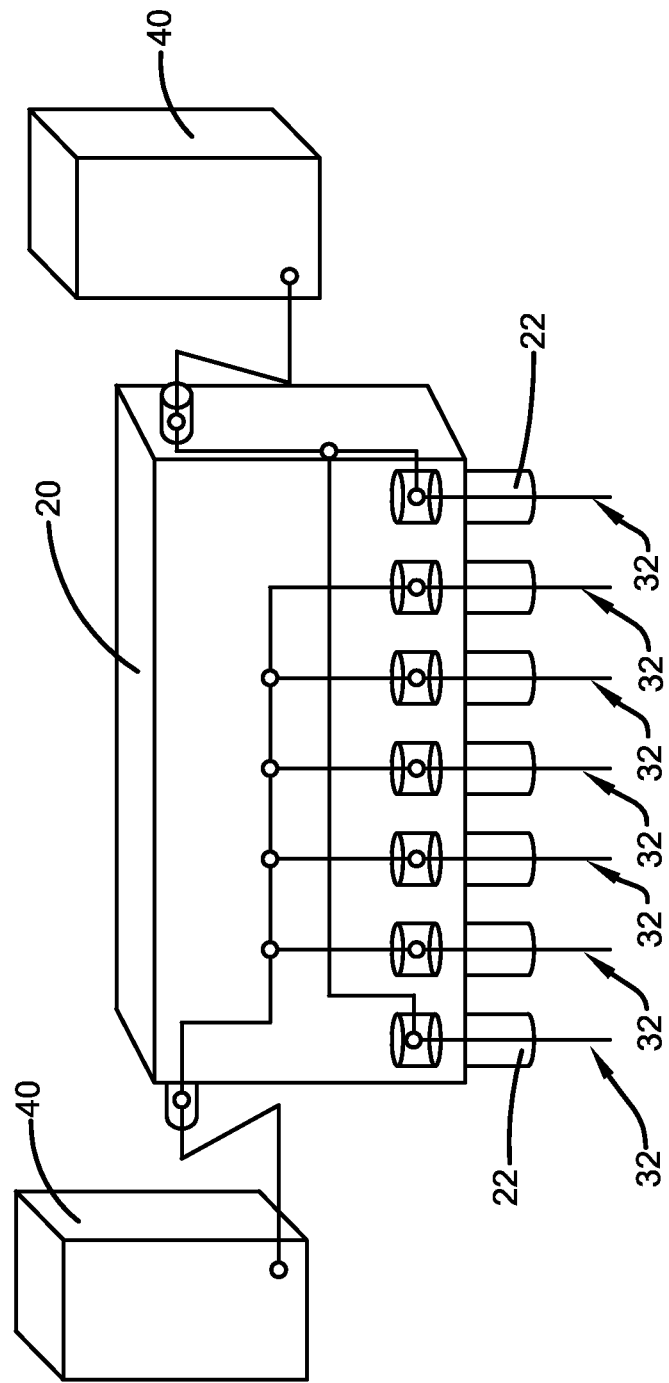
FIG. 10A is a perspective view of another embodiment of a welding device.
Figure 10B:
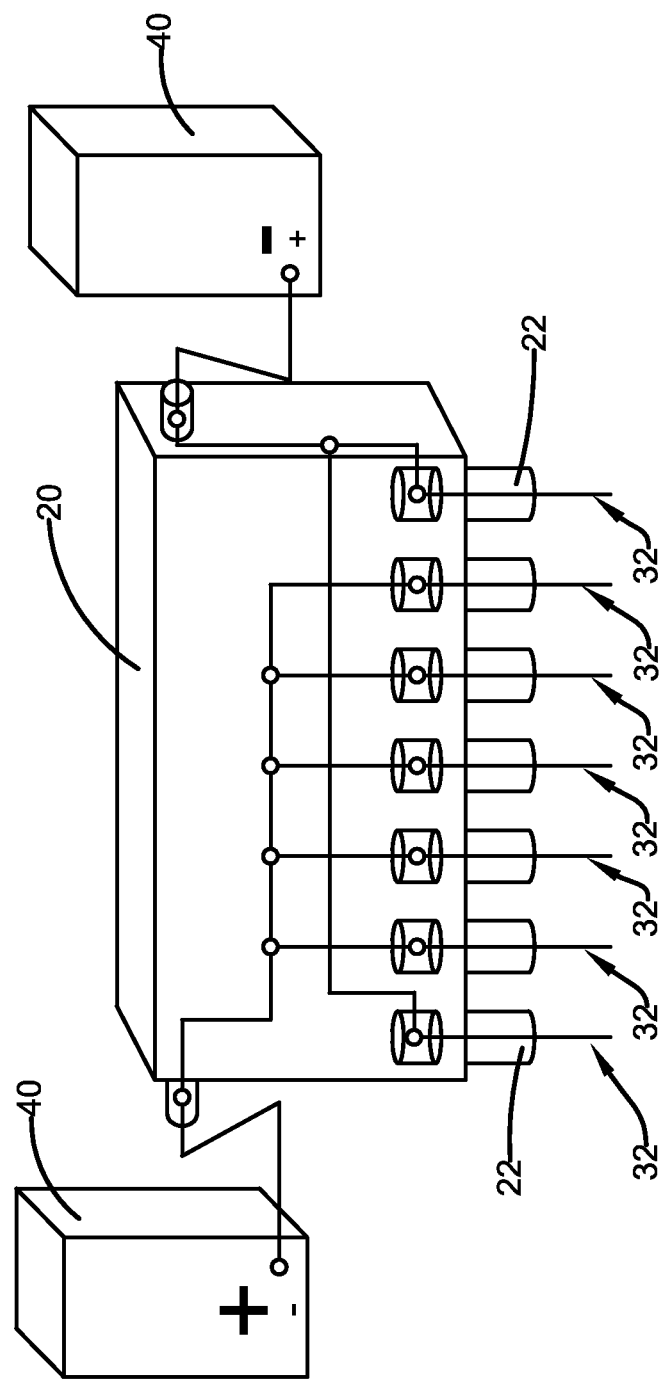
FIG. 10B is a perspective view of another embodiment of a welding device.

With reference now to FIGS. 10A and 10B, an alternate embodiment is envisioned where different contact tips 22 mounted within the electrode head 20 are connected to receive power at different voltage potentials and/or different polarities. For example, one set of electrodes 32 may be connected to a first power source 40 set at a first voltage and polarity. The remaining electrodes 32, i.e. common to the same electrode head 20, may be connected to a different power source 40' set to deliver power at a different voltage potential and polarity. In this embodiment, multiple electrode head connectors may be utilized, however the electrode head 20 may be configured such that power connections to the contact tips 22 is customized for a particular operation. For example, one power source 50 may be configured to deliver 600 amps of current to electrodes 32 arranged at the outside of array 30, while a different power source 50 may be configured to deliver a relatively lower current, for example 450 amps, to electrodes 32 arranged at the inside of array 30, so as to substantially reduce and/or eliminate the effects of the magnetic force induced by the flow of current through each electrode 32. Similarly, one power source 50 may be configured to deliver power to electrodes 32 arranged at the outside of array 30 at a negative polarity, while a different power source 50 may be configured to deliver power to electrodes 32 arranged at the inside of array 30 at a positive polarity, so as to substantially reduce and/or eliminate the effects of the magnetic force induced by the flow of current through each electrode 32. In such a configuration, the current delivered by each power source 50 may be the same or different current, depending upon the cladding operation. All such configurations are to be construed as falling with the scope of coverage of the embodiments of the subject invention.

It is noted here that in the instance where AC power is used in the welding or cladding process, it may be necessary to coordinate the waveforms generated by the respective power sources 40, 40' for substantially reducing and/or eliminating the effects of the magnetic force induced by the flow of current through the electrodes 32. In one example, power from one power source 40 may be connected to a first group of electrodes 32 (which may be the innermost electrodes 32) and power from power source 40' may be connected to a second group of electrodes 32, i.e. the outermost electrodes, within the same electrode head 20. In another example, two electrode heads 20 may be adjacently positioned for depositing material in tandem. One power source 40 may be connected to all of the electrodes 32 in the forwardmost electrode head 20 and the other power source 40' connected to the electrodes 32 of the rearward electrode head 32. In each of these instances, the AC waveforms may be synchronized such that power delivered to the electrode head 20 unbalances the magnetic forces that would otherwise divert or shift material on the surface of the workpiece or substrate. In other words, the effects of the magnetic forces on the molten fluid material are substantially reduced and/or negated. Still, it is to be construed that any manner of coordinating the waveforms, i.e. either synchronizing or desynchronizing, may be chosen as is appropriate for use with the embodiments of the subject invention.

Figure 11:
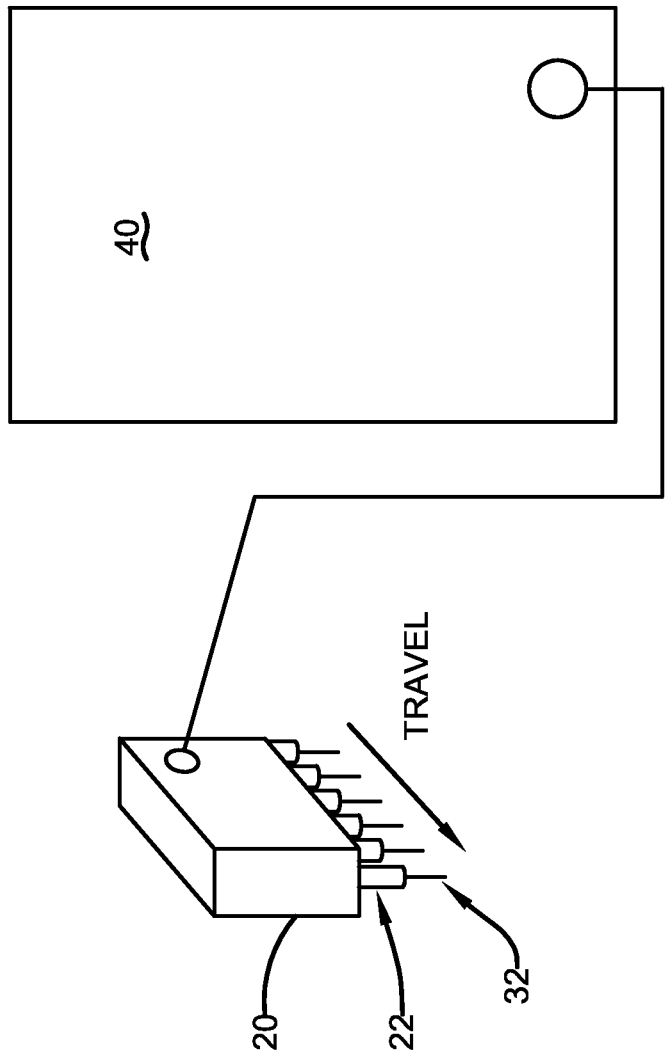
FIG. 11 is a perspective view of another embodiment of a welding device.

As shown in FIG. 1, the array 30 of electrodes 32 may be configured substantially linearly within electrode head 20, with electrode head 20 oriented perpendicularly with respect to the welding trajectory (depicted by the path of travel). As such, electrode head 20 is able to deposit a single, continuous weld bead or pool across a width of a workpiece. As shown in FIG. 11, electrode head 20 may be rotated 90° from the arrangement shown in FIG. 1. Such an arrangement may permit a relatively high rate of cladding material deposition while still maintaining low power consumption. Depending upon the number and configuration of electrodes 32 within electrode head 20, multiple cladding passes by a single electrode may be replaced by a single cladding pass performed by electrode head 20 oriented as shown in FIG. 11.

Figure 12:
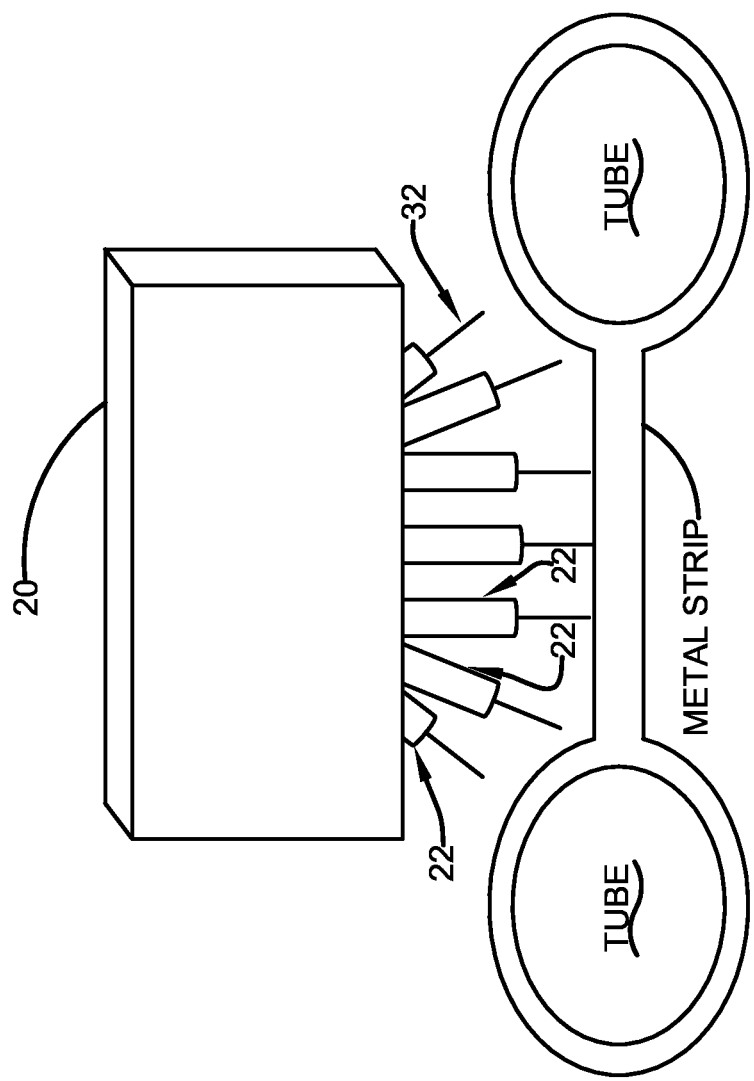
FIG. 12 is a perspective view of another embodiment of an electrode head.
Figure 13:
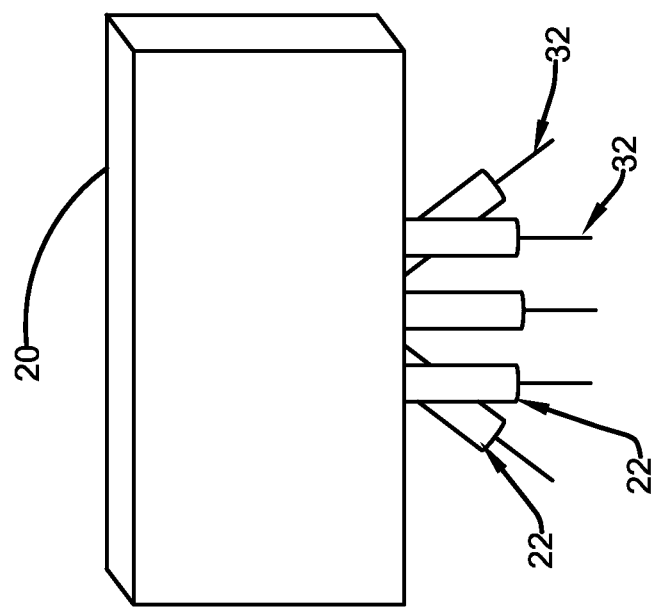
FIG. 13A is a perspective view of another embodiment of an electrode head.
FIG. 13B is a cut-away plane view of the embodiment of the electrode head.
FIG. 13C is a cut-away plane view of the embodiment of the electrode head.
Figure 13B:
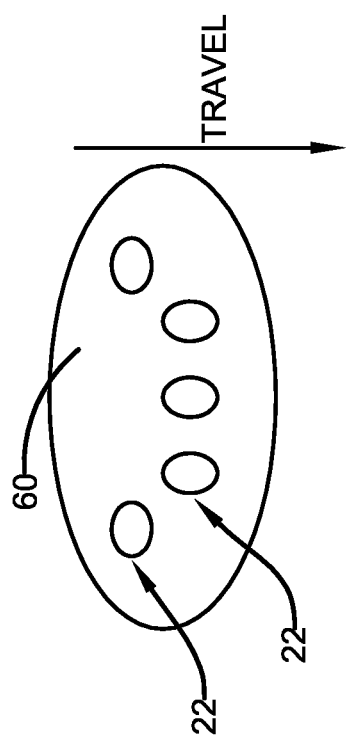
Figure 13C:
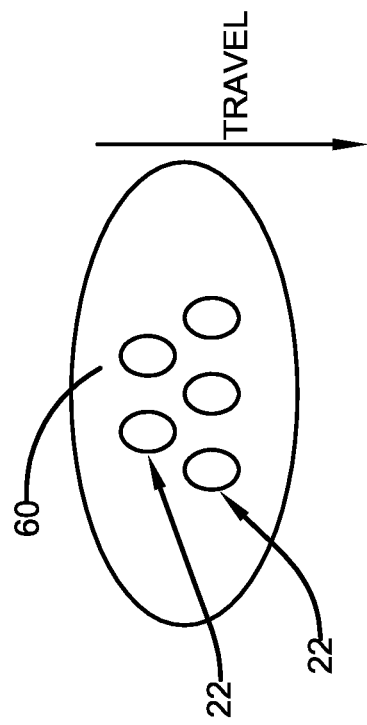
Figure 14:
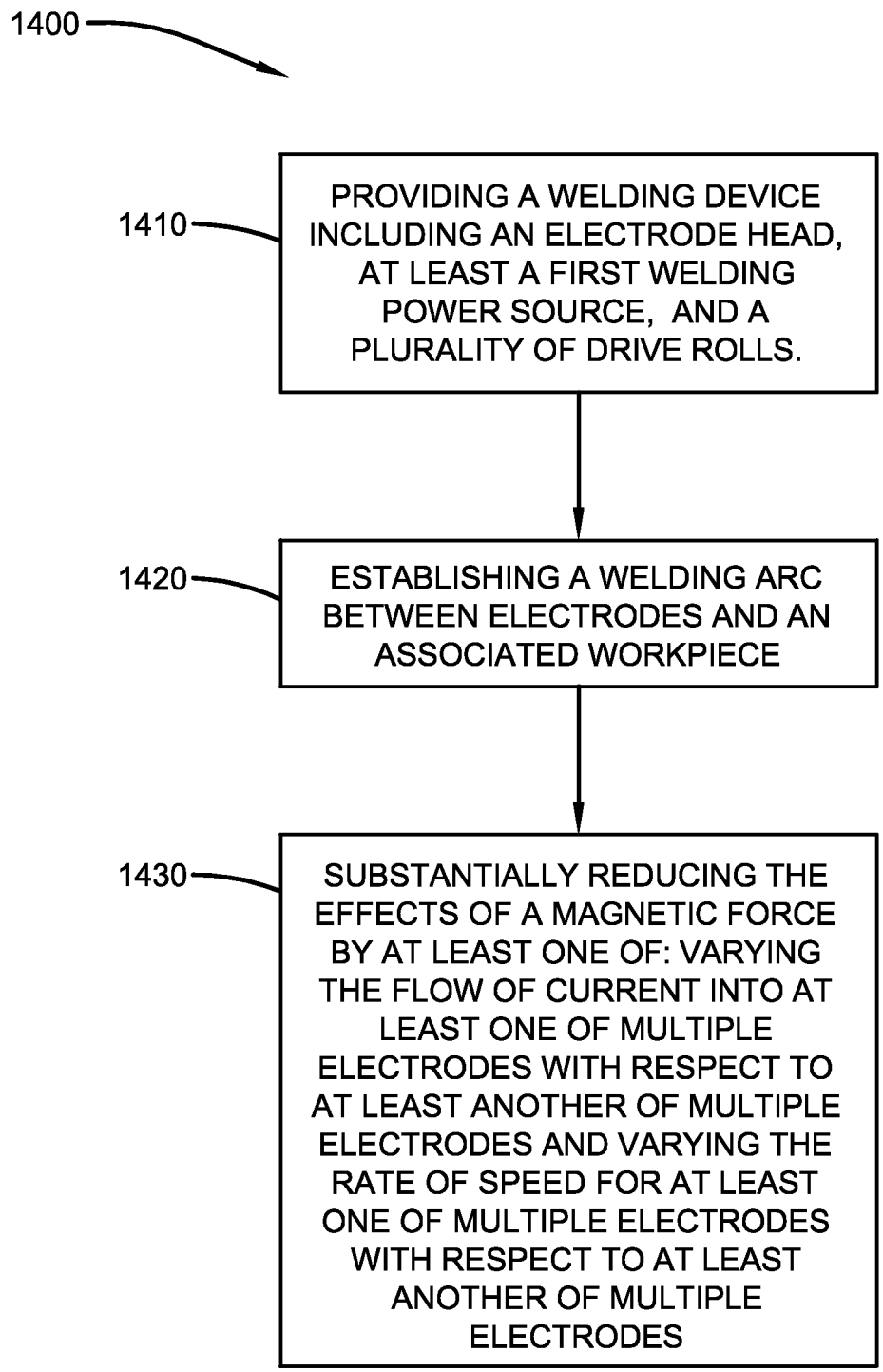
FIG. 14 is a flow diagram of cladding a workpiece.
Figure 15:
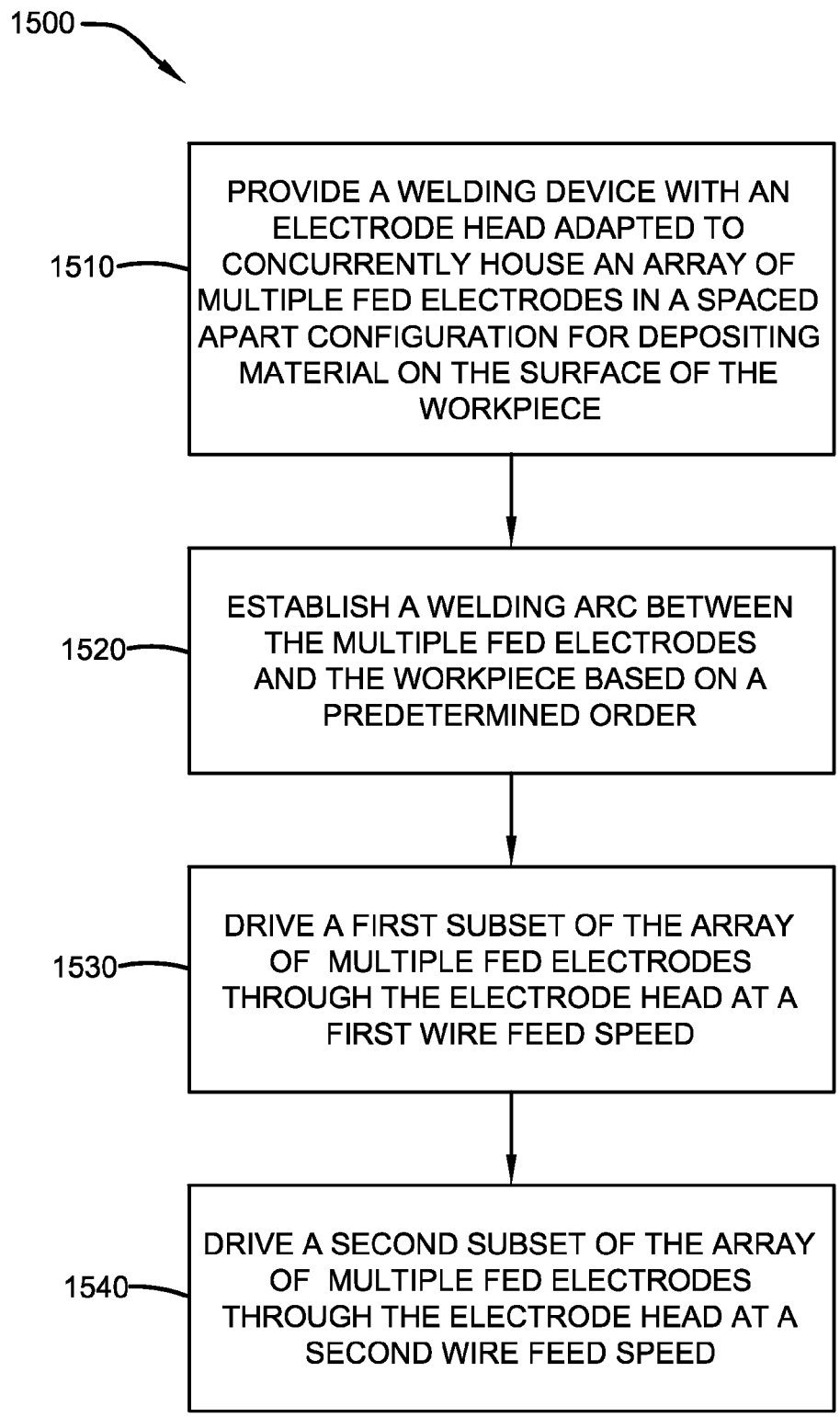
FIG. 15 is a flow diagram of depositing material on a surface of a workpiece.

It is also envisioned that electrode head 20 may be configured such that contact tips 22 direct electrodes 32 at different angles of orientation relative to the workpiece. For example, it may be desirable to clad a pair of tubes connected by a strip of metal in an application known as a water wall, as shown in FIG. 12. In such an operation, electrodes 32 may be configured at angles which direct molten cladding material up the walls of the tubes of a water wall. In another alternative shown in FIGS. 13A and 13B, contact tips 22 and electrodes 32 may be configured in two rows. In this alternative, the electrodes 32 in one of the rows may be configured so as to "feather" the weld bead out or to allow the force of the arc to push the weld metal to the sides of the weld pool 60. Such an arrangement may be used to increase the amount of cladding material at the outside of the weld pool. In another alternative shown in FIG. 13C, the electrodes 32 may also be configured in two rows, such that the electrodes 32 in the trailing row (with respect to the direction of travel) deposit material which overlaps material deposited by electrodes in the leading row (with respect to the direction of travel). It is known that magnetic forces are induced by electric current flowing through electrodes 32 may result in relatively less material deposition at positions between electrodes. As such, this exemplary configuration, and other potential configurations, of electrodes 32 and contact tips 22 within the electrode head 20 may substantially reduce the effects of the induced magnetic forces.

Figure 16:
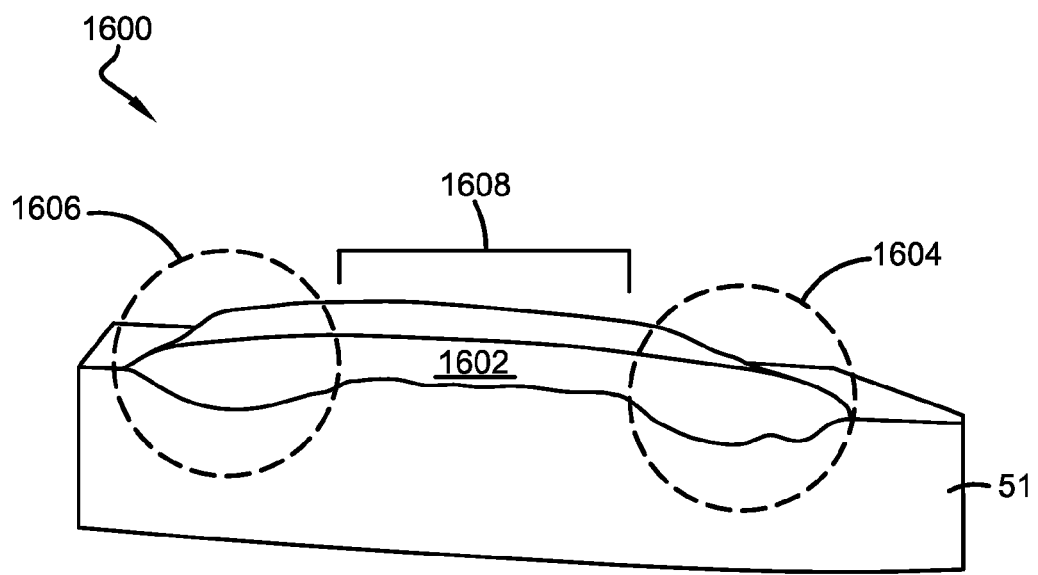
FIG. 16 is a perspective view of depositing material on a surface of a workpiece.

Turning to FIG. 16, a perspective view 1600 is illustrated of depositing material onto workpiece 51. Material 1602 is deposited onto a surface of workpiece 51 via a welding process as described herein. Upon deposition, material 1602 can include middle section 1608, first edge 1604, and second edge 1606. Based on the electrodes located outward of the at least one electrode near the center of the electrode head being driven at a first wire feed speed and the at least one electrode near the center of the electrode head being driven at a second wire feed speed, first edge 1604 and second edge 1606 have deeper penetration in comparison to middle section 1608. In other words, there is increased penetration due to the increased wire feed speed of the curtain wires (e.g., electrodes outward of the at least one electrode near the center of the electrode head). The increased penetration of material 1602 facilitates transitioning a clad bead and prevents a lack of penetration on a leading edge of the puddle. The lack of penetration is at the edges of the weld bead especially at the intersection of that edge to an edge of a previous pass or where that pass meets a shoulder in workpiece 51. These edges have greater surface area and tend to pull more heat from the process, resulting in lack of penetration. The ability to increase wire feed speed (wfs) of the edge wires allows the penetration at the edge of the weld bead to be increased thereby eliminating lack of penetration.

With reference to all of the FIGS. 1-13 and 16, method 1400 is a flow diagram of depositing cladding material onto an associated workpiece resulting from the flow of electrical current through a plurality of associated electrodes is illustrated. Method 1400 may include the steps of providing a welding device including an electrode head, at least a first welding power source, and a plurality of drive rolls (reference block 1410). A welding arc can be established arc between electrodes and a workpiece (reference block 1420). The effects of a magnetic force can be substantially reduced by at least one of varying the flow of current into at least one of multiple electrodes with respect to at least another of multiple electrodes and varying the rate of speed for at least one of multiple electrodes with respect to at least another of multiple electrodes (reference block 1430).

Method 1500 is a flow diagram of depositing material on a surface of a workpiece. A welding device with an electrode head adapted to concurrently house an array of multiple electrodes in a spaced apart configuration can be provided for depositing material on the surface of the workpiece (reference block 1510). A welding arc can be established between the associated multiple fed electrodes and the workpiece based on a predetermined order (reference block 1520). A first subset of the array of multiple fed electrodes can be driven through the electrode head at a first wire feed speed (reference block 1530). A second subset of the array of multiple fed electrodes can be driven through the electrode head at a second wire feed speed (reference block 1540).

In an embodiment, the method can include identifying a location of the electrode head on the workpiece and establishing the welding arc with the predetermined order based on the location. In an embodiment, the method can include starting a motion of the electrode head in a direction of travel on the workpiece, identifying an alignment of the one or more of the multiple electrodes of the electrode head on the workpiece, and establishing the welding arc with the predetermined order based on at least one of the motion or the alignment. In an embodiment, the method can include terminating the welding arc between the multiple electrodes and the workpiece based on a second predetermined order. In an embodiment, the method can include stopping a motion of the electrode head in a direction of travel on the workpiece, identifying a nonalignment of the one or more of the multiple electrodes of the electrode head on the workpiece, and terminating the welding arc with a second predetermined order based on at least one of the motion or the alignment.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welding device for depositing material on the surface of a cylindrical workpiece, comprising:
   an electrode head adapted to concurrently house an array of multiple electrodes in a spaced apart configuration, for depositing material on the surface of the workpiece, wherein the array of multiple electrodes includes at least one electrode near a center of the electrode head and plural electrodes located outward of the at least one electrode near the center of the electrode head, wherein the electrode head is actuatable through a welding trajectory around the cylindrical workpiece, and the multiple electrodes are arrayed substantially linearly and perpendicular to said welding trajectory;
   a welding power source adapted to provide power for establishing a welding arc between each of the multiple electrodes and the cylindrical workpiece;
   at least one drive roll that is configured to drive at least one of the multiple electrodes through the electrode head, wherein the electrodes located outward of the at least one electrode near the center of the electrode head are driven at a first wire feed speed and the at least one electrode near the center of the electrode head is driven at a second wire feed speed; and
   the first wire speed is greater than the second wire feed speed,
   wherein the welding power source is further adapted to provide power for establishing the welding arc in a predetermined order for one or more of the multiple electrodes arrayed substantially linearly and perpendicular to said welding trajectory around the cylindrical workpiece, and the predetermined order is based on a location of the electrode head along the cylindrical workpiece.

2. The welding device of claim 1, wherein the welding power source is further adapted to provide power for establishing the welding arc in the predetermined order for one or more of the multiple electrodes during a start of motion of the electrode head through the welding trajectory.

3. The welding device of claim 1, wherein the at least one drive roll terminates driving at least one of the multiple electrodes through the electrode head in the predetermined order during a stop of motion of the electrode head through the welding trajectory.

4. The welding device of claim 1, wherein magnetic forces resulting from electrical current flowing through the multiple electrodes affects the deposition of material on the surface of the cylindrical workpiece with a pinch force on a puddle on the cylindrical workpiece, created from the welding arc and at least one electrode
   wherein the electrodes located outward of the at least one electrode near the center of the electrode head are driven at the first wire feed speed to compensate for the pinch force and to increase penetration for the electrodes located outward of the at least one electrode near the center of the electrode head based on the first wire feed speed being at least 1.5 times greater than the second wire feed speed.

5. The welding device of claim 1, wherein the electrode head includes a plurality of apertures adapted to receive the multiple electrodes.

6. The welding device of claim 1, wherein each of the multiple electrodes in the array are connected to the same voltage potential.

7. The welding device of claim 1, wherein at least one drive roll is associated with at least one of the multiple electrodes.

8. The welding device of claim 1, further comprising:
   an infrared or proximity sensor that is configured to detect a contact between at least one electrode and the cylindrical workpiece; and
   the at least one drive roll drives at least one electrode based on the sensor; and
   the welding power source provides power for establishing a welding arc for the at least one electrode based on the sensor.

9. The welding device of claim 1, further comprising:
   an infrared or proximity sensor that is configured to detect a noncontact between at least one electrode and the cylindrical workpiece; and
   the at least one drive roll terminates drive of at least one electrode based on the sensor.

10. A welding device for depositing material on the surface of a workpiece, comprising:
    an electrode head adapted to concurrently house an array of multiple electrodes in a spaced apart configuration for depositing material on the surface of the workpiece, wherein the array of multiple electrodes includes at least one electrode near a center of the electrode head and plural electrodes located outward of the at least one electrode near the center of the electrode head, wherein the electrode head is actuatable through a welding trajectory;
    a welding power source adapted to provide power for establishing a welding arc between each of the multiple electrodes and the workpiece;
    at least one drive roll that is configured to drive at least one of the multiple electrodes through the electrode head, wherein the electrodes located outward of the at least one electrode near the center of the electrode head are driven at a first wire feed speed and the at least one electrode near the center of the electrode head is driven at a second wire feed speed; and
    the first wire speed is greater than the second wire feed speed,
    wherein magnetic forces resulting from electrical current flowing through the multiple electrodes affects the deposition of material on the surface of the workpiece with a pinch force on a puddle created from the welding arc and at least one electrode, and wherein the electrode head is configured to house the array of multiple electrodes in a positional arrangement that compensates for the pinch force resultant from the magnetic forces upon material deposition, wherein the electrodes located outward of the at least one electrode near the center of the electrode head are driven at the first wire feed speed to compensate for the pinch force and to increase penetration for the electrodes located outward of the at least one electrode near the center of the electrode head based on the first wire feed speed being at least 1.5 times greater than the second wire feed speed.

11. A method for depositing material on a surface of a cylindrical workpiece, comprising:

providing a welding device with an electrode head adapted to concurrently house an array of multiple electrodes in a spaced apart configuration for depositing material on the surface of the workpiece, wherein the array of multiple electrodes is a substantially linear array;

establishing a welding arc between the multiple electrodes and the workpiece based on a predetermined order according to a location of the electrode head along the cylindrical workpiece;

driving a first subset of the array of multiple electrodes through the electrode head at a first wire feed speed;

driving a second subset of the array of multiple electrodes through the electrode head at a second wire feed speed; and moving the electrode head along a welding trajectory around the cylindrical workpiece, wherein the welding trajectory is substantially perpendicular to the linear array of multiple electrodes.

12. The method of claim 11, wherein the second subset of the array of multiple electrodes is located central of the first subset of the array of multiple electrodes, and the first wire feed speed is at least 1.5 times greater than the second wire feed speed, thereby compensating for a pinch force on a weld puddle created on the cylindrical workpiece.

13. The method of claim 11, wherein the electrode head comprises an infrared or proximity sensor that is configured to detect a contact between at least one electrode and the cylindrical workpiece.

14. The method of claim 11, further comprising:

terminating the welding arc between the multiple electrodes and the cylindrical workpiece based on a second predetermined order.

15. A welding device for depositing material on the surface of a cylindrical workpiece, comprising:

an electrode head adapted to concurrently house an array of multiple electrodes in a spaced apart configuration, for depositing material on the surface of the workpiece, wherein the array of multiple electrodes includes at least one electrode near a center of the electrode head and plural electrodes located outward of the at least one electrode near the center of the electrode head, wherein the electrode head is actuatable through a welding trajectory around the cylindrical workpiece, and the multiple electrodes are arrayed substantially linearly and perpendicular to said welding trajectory;

means for providing power for establishing a welding arc between each of the multiple electrodes and the cylindrical workpiece based on a first predetermined order according to a location of the electrode head along the cylindrical workpiece;

means for terminating a drive of at least one of the multiple electrodes based on a second predetermined order according to another location of the electrode head along the cylindrical workpiece; and means for driving the array of multiple electrodes through the electrode head such that the electrodes located outward of the at least one electrode near the center of the electrode head are driven at a first wire feed speed and the at least one electrode near the center of the electrode head is driven at a second wire feed speed, wherein the first wire speed is at least 1.5 times greater than the second wire feed speed, thereby compensating for a pinch force on a weld puddle created on the cylindrical workpiece.

\* \* \* \* \*